United States Patent
Symes et al.

(10) Patent No.: US 12,361,274 B2
(45) Date of Patent: Jul. 15, 2025

(54) PROCESSING UNIT FOR PERFORMING OPERATIONS OF A NEURAL NETWORK

(71) Applicant: Arm Limited, Cambridge (GB)

(72) Inventors: Dominic Hugo Symes, Cambridge (GB); John Wakefield Brothers, III, Cambridge (GB); Fredrik Peter Stolt, Cambridge (GB)

(73) Assignee: Arm Limited, Cambridge (GB)

( * ) Notice: Subject to any disclaimer, the term of this patent is extended or adjusted under 35 U.S.C. 154(b) by 728 days.

(21) Appl. No.: 16/859,062

(22) Filed: Apr. 27, 2020

(65) Prior Publication Data

US 2021/0334643 A1    Oct. 28, 2021

(51) Int. Cl.
*G06N 3/08* (2023.01)
*G06N 3/04* (2023.01)

(52) U.S. Cl.
CPC .................. *G06N 3/08* (2013.01); *G06N 3/04* (2013.01)

(58) Field of Classification Search
CPC ..................................... G06N 3/08; G06N 3/04
See application file for complete search history.

(56) References Cited

U.S. PATENT DOCUMENTS

2016/0092765 A1* 3/2016 Chilimbi ................ G06N 3/084
709/201

OTHER PUBLICATIONS

You, Y., Buluç, A., & Demmel, J. (Nov. 2017). Scaling deep learning on gpu and knights landing clusters. In Proceedings of the International Conference for High Performance Computing, Networking, Storage and Analysis (pp. 1-12). (Year: 2017).*

Wang, Z., Wang, S., Zhang, X., Wang, S., & Ma, S. (Oct. 2018). Fast QTBT partitioning decision for interframe coding with convolution neural network. In 2018 25th IEEE International Conference on Image Processing (ICIP) (pp. 2550-2554). IEEE. (Year: 2018).*

Chen, H., Engkvist, O., Wang, Y., Blaschke, T., Olivecrona, M. (Jan. 31, 2018). The rise of Deep Learning in Drug Discovery. Drug Discovery Today. https://www.sciencedirect.com/science/article/pii/S1359644617303598 (Year: 2018).*

Harlap, A., Narayanan, D., Phanishayee, A., Seshadri, V., Devanur, N., Ganger, G., & Gibbons, P. (2018). Pipedream: Fast and efficient pipeline parallel dnn training. arXiv preprint arXiv:1806.03377. (Year: 2018).*

* cited by examiner

*Primary Examiner* — Kamran Afshar
*Assistant Examiner* — Lokesha G Patel
(74) *Attorney, Agent, or Firm* — EIP US LLP

(57) ABSTRACT

A processing unit is described that receives an instruction to perform a first operation on a first layer of a neural network, block dependency data, and an instruction to perform a second operation on a second layer of the neural network. The processing unit performs the first operation, which includes dividing the first layer into a plurality of input blocks, and operating on the input blocks to generate a plurality of output blocks. The processing unit then performs the second operation after the first operation has generated a set number of output blocks defined by the block dependency data.

7 Claims, 7 Drawing Sheets

|   |   |   |   | 51 |   | 50 |   | 52 |   |   |
|---|---|---|---|----|---|----|---|----|---|---|
| 0 | 5 | 3 | 2 | 1  | 0 | 1  | 0 | 1  | 1 | 2 | 0 |
| 1 | 0 | 2 | 2 | 1  | 1 | 3  | 0 | 2  | 3 | 0 | 1 |
| 2 | 1 | 4 | 5 | 0  | 1 | 2  | 2 | 5  | 6 | 1 | 1 |
| 5 | 0 | 4 | 0 | 1  | 1 | 3  | 0 | 1  | 2 | 0 | 1 |
| 1 | 1 | 5 | 3 | 4  | 0 | 1  | 3 | 3  | 3 | 1 | 1 |
| 3 | 3 | 0 | 6 | 7  | 2 | 1  | 3 | 7  | 3 | 0 | 3 |
| 1 | 0 | 1 | 2 | 3  | 2 | 0  | 6 | 6  | 5 | 0 | 1 |

Fig. 6

PROCESSING UNIT FOR PERFORMING OPERATIONS OF A NEURAL NETWORK

BACKGROUND OF THE INVENTION

Field of the Invention

The present invention relates to a processing unit for performing operations of a neural network.

Description of the Related Technology

In a neural network the output of one operation typically forms the input of a subsequent operation. This then presents challenges when trying to implement the neural network using pipeline processing.

SUMMARY

According to a first aspect of the present disclosure, there is provided a processing unit configured to: receive an instruction to perform a first operation on a first layer of a neural network; receive block dependency data; receive an instruction to perform a second operation on a second layer of the neural network; perform the first operation comprising dividing the first layer into a plurality of input blocks, and operating on the input blocks to generate a plurality of output blocks; and perform the second operation after the first operation has generated a set number of output blocks, the set number being defined by the block dependency data.

According to a second aspect of the present disclosure, there is provided a method comprising: receiving an instruction to perform a first operation on a first layer of a neural network; receiving block dependency data; receiving an instruction to perform a second operation on a second layer of the neural network; performing the first operation comprising dividing the first layer into a plurality of input blocks, and operating on the input blocks to generate a plurality of output blocks; and performing the second operation after the first operation has generated a set number of output blocks, the set number being defined by the block dependency data.

According to a third aspect of the present disclosure, there is provided a system comprising a first processing unit, and a second processing unit, wherein: the first processing unit outputs a command stream to the second processing unit; the command stream comprises an instruction to perform a first operation on a first layer of a neural network, block dependency data, and an instruction to perform a second operation on a second layer of the neural network; and in response to the command stream, the second processing unit: performs the first operation comprising dividing the first layer into a plurality of input blocks, and operating on the input blocks to generate a plurality of output blocks; and performs the second operation after the first operation has generated a set number of output blocks, the set number being defined by the block dependency data.

Further features will become apparent from the following description, given by way of example only, which is made with reference to the accompanying drawings.

BRIEF DESCRIPTION OF THE DRAWINGS

FIG. 6 illustrates an example of a pooling kernel.

DETAILED DESCRIPTION OF CERTAIN INVENTIVE EMBODIMENTS

Figure 1:
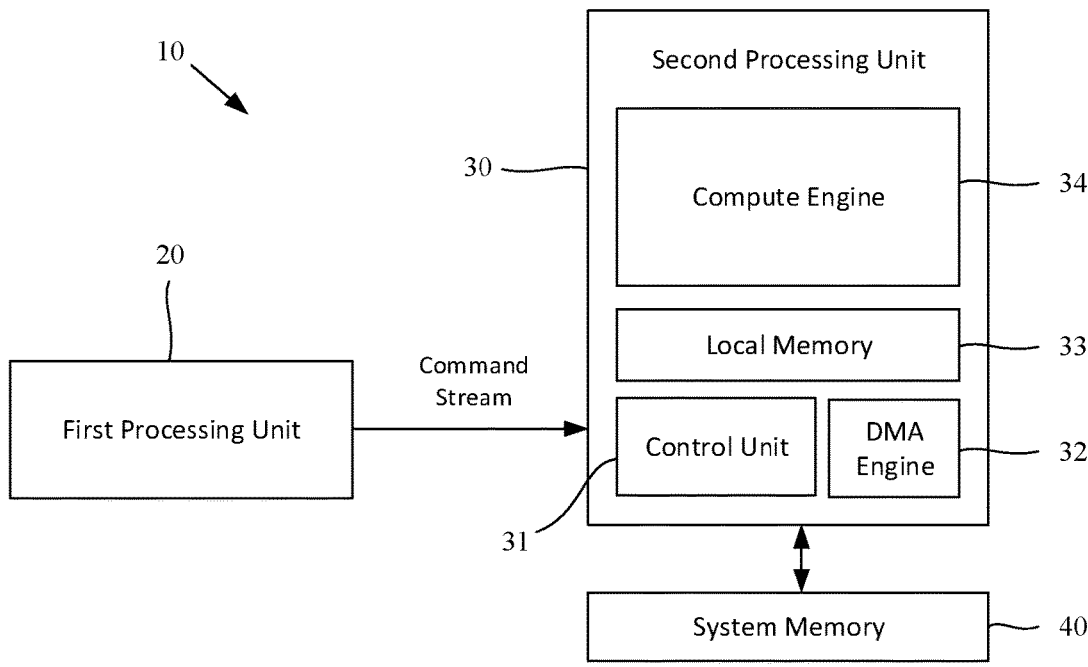
FIG. 1 is a block diagram of an example system.

Details of systems and methods according to examples will become apparent from the following description, with reference to the Figures. In this description, for the purpose of explanation, numerous specific details of certain examples are set forth. Reference in the specification to "an example" or similar language means that a particular feature, structure, or characteristic described in connection with the example is included in at least that one example, but not necessarily in other examples. It should further be noted that certain examples are described schematically with certain features omitted and/or necessarily simplified for ease of explanation and understanding of the concepts underlying the examples.

In examples described herein, there is provided a processing unit configured to: receive an instruction to perform a first operation on a first layer of a neural network; receive block dependency data; receive an instruction to perform a second operation on a second layer of the neural network; perform the first operation comprising dividing the first layer into a plurality of input blocks, and operating on the input blocks to generate a plurality of output blocks; and perform the second operation after the first operation has generated a set number of output blocks, the set number being defined by the block dependency data. As a result, the processing unit may employ pipeline processing to perform the two operations without the risk of operating on invalid data. In particular, by performing the second operation after the first operation has generated a set number output blocks, a data hazard, in which the second operation operates on data that has not yet been generated by the first operation, may be avoided. Moreover, by providing a processing unit that receives block dependency data, which is then used to determine when to perform the second operation, the processing unit may perform the two operations without the need to calculate, determine or otherwise make decisions about data dependency. As a result, the hardware requirements of the processing unit may be reduced.

The second operation may comprise dividing the second layer into a plurality of further input blocks, and operating on the further input blocks to generate a plurality of further output blocks. The second operation may then operate on the further input blocks to generate further output block X after the first operation has generated output block Y, where Y is a function of X and is defined by the block dependency data. As a result, a better balance may be achieved between the desire to generate the further output blocks of the second operation as soon as possible with the need to ensure that the required output blocks of the first operation have been generated.

The second operation may operate on the further input blocks to generate further output block X after the first operation has generated all but $\max(D-X,0)$ of the output blocks, where D is defined by the block dependency data.

The first operation may generate N output blocks, and the processing unit may perform the second operation after the first operation has generated N−Y output blocks, where Y is non-zero and is defined by the block dependency data. The processing unit may therefore perform the second operation at a time when the first operation is still generating output blocks. As a result, the processing unit may perform the two operations more quickly.

The first operation may comprise generating the second layer using the output blocks. For example, each output block may form a part of the second layer. Alternatively, the first operation may comprise accumulating output blocks to generate an accumulated block, which may then form part or all of the second layer. The accumulated block may have the same size as each of the output blocks.

In examples described herein, there is also provided a method comprising: receiving an instruction to perform a first operation on a first layer of a neural network; receiving block dependency data; receiving an instruction to perform a second operation on a second layer of the neural network; performing the first operation comprising dividing the first layer into a plurality of input blocks, and operating on the input blocks to generate a plurality of output blocks; and performing the second operation after the first operation has generated a set number of output blocks, the set number being defined by the block dependency data.

In examples described herein, there is further provided a system comprising a first processing unit, and a second processing unit, wherein: the first processing unit outputs a command stream to the second processing unit; the command stream comprises an instruction to perform a first operation on a first layer of a neural network, block dependency data, and an instruction to perform a second operation on a second layer of the neural network; and in response to the command stream, the second processing unit: performs the first operation comprising dividing the first layer into a plurality of input blocks, and operating on the input blocks to generate a plurality of output blocks; and performs the second operation after the first operation has generated a set number of output blocks, the set number being defined by the block dependency data.

FIG. 1 shows an example of a system 10 for implementing, in whole or in part, a neural network. The system 10 comprises a first processing unit 20, a second processing unit 30, and a system memory 40. In order to simplify the following description, as well as to better distinguish the two processing units, the first processing unit 20 will hereafter be referred to as the CPU and the second processing unit 30 will be referred to as the NPU. The choice of label for each processing unit should not, however, be interpreted as implying a particular architecture or functionality beyond that described below.

The NPU 30 comprises a control unit 31, a direct memory access (DMA) engine 32, a local memory 33, and a compute engine 34. The control unit 31 manages the overall operation of the NPU 30. The DMA engine 32, in response to instructions from the control unit 31, moves data between the local memory 33 and the system memory 40. The compute engine 34, again under instruction from the control unit 31, performs operations on the data stored in the local memory 33.

The CPU 20 outputs a command stream to the NPU 30. The command stream comprises a set of instructions for performing, all or part, of the operations that define the neural network. The command stream may be generated in real-time by the CPU 20. Alternatively, the command stream may be generated offline and stored by the CPU 20. In particular, the instructions of the command stream may be compiled and optimized offline according to the architecture of the neural network, as well as the architecture of the NPU.

Figure 2:
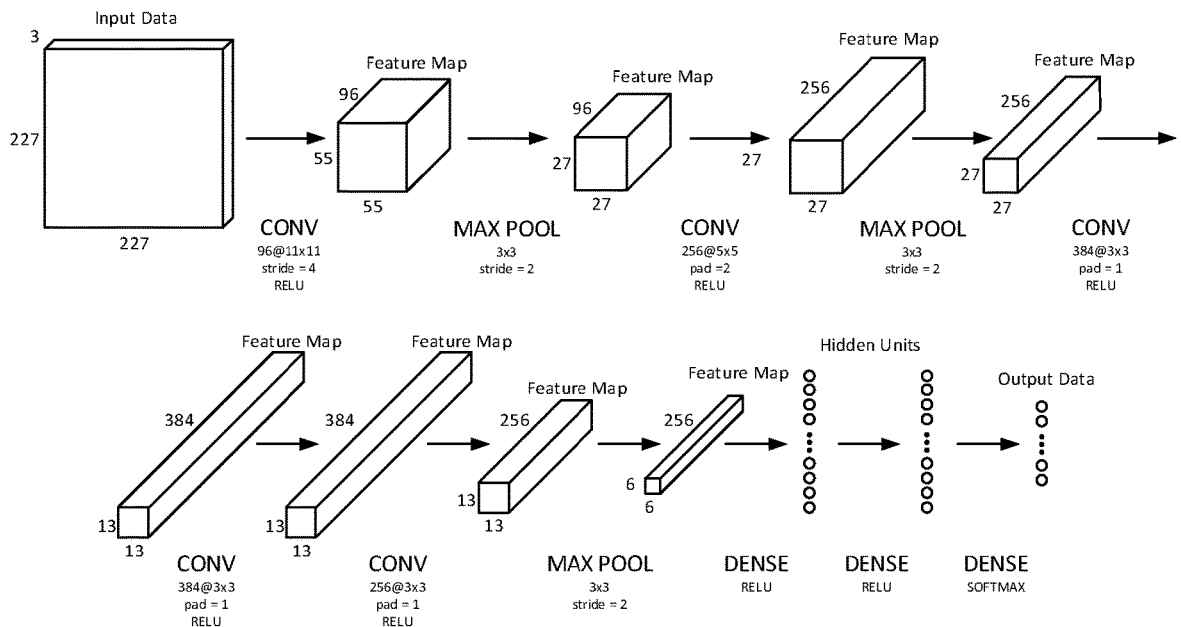
FIG. 2 illustrates an example of a neural network.

FIG. 2 shows an example of a convolutional neural network that may be implemented, in whole or in part, by the system 10. Other architectures and/or other types of neural network, such as recurrent neural networks, may be implemented, in whole or in part, by the system 10.

In response to instructions within the command stream, the NPU 30 operates on an input layer and generates in response an output layer. The output layer then serves as the input layer for a subsequent operation of the neural network. The term 'input layer' should be understood to mean any data structure that serves as the input for an operation of the neural network. Similarly, the term 'output layer' should be understood to mean any data structure that is output by an operation of the neural network. Accordingly, the input layer and/or the output layer may a tensor of any rank. In the example of FIG. 2, the input data serves as the input layer for the first convolution operation. The resulting output layer is then a feature map, which subsequently serves as the input layer for the pooling operation.

An instruction within the command stream may comprise the type of operation to be performed, the locations in the system memory 40 of the input layer, the output layer and, where applicable, the weights, along with other parameters relating to the operation, such as the number of kernels, kernel size, stride, padding and/or activation function.

The size of an input layer and/or output layer may exceed that of the local memory 33 of the NPU 30. For example, in the neural network of FIG. 2, the first feature map, which serves as the input layer to the first pooling operation, has the dimensions 55×55×96. Assuming each element of the input layer stores an 8-bit value, the size of the input layer is around 290 kB. By contrast, the local memory 33 of the NPU 30 may be of the order of 10 to 50 kB. An operation instruction may therefore additionally include a block size to be used by the NPU 30 when performing the operation.

In response to an operation instruction that includes a block size, the NPU 30 divides the input layer into a plurality of input blocks defined by the block size. The NPU 30 then operates on each input block and generates an output block. As explained below with reference to FIGS. 3 and 4, the NPU 30 may write the output block to the system memory 40 as a block of the output layer. Alternatively, the NPU 30 may add the output block to one or more previously generated output blocks to create an accumulated block, and then write the accumulated block to the system memory 40 as a block of the output layer.

Figure 3:
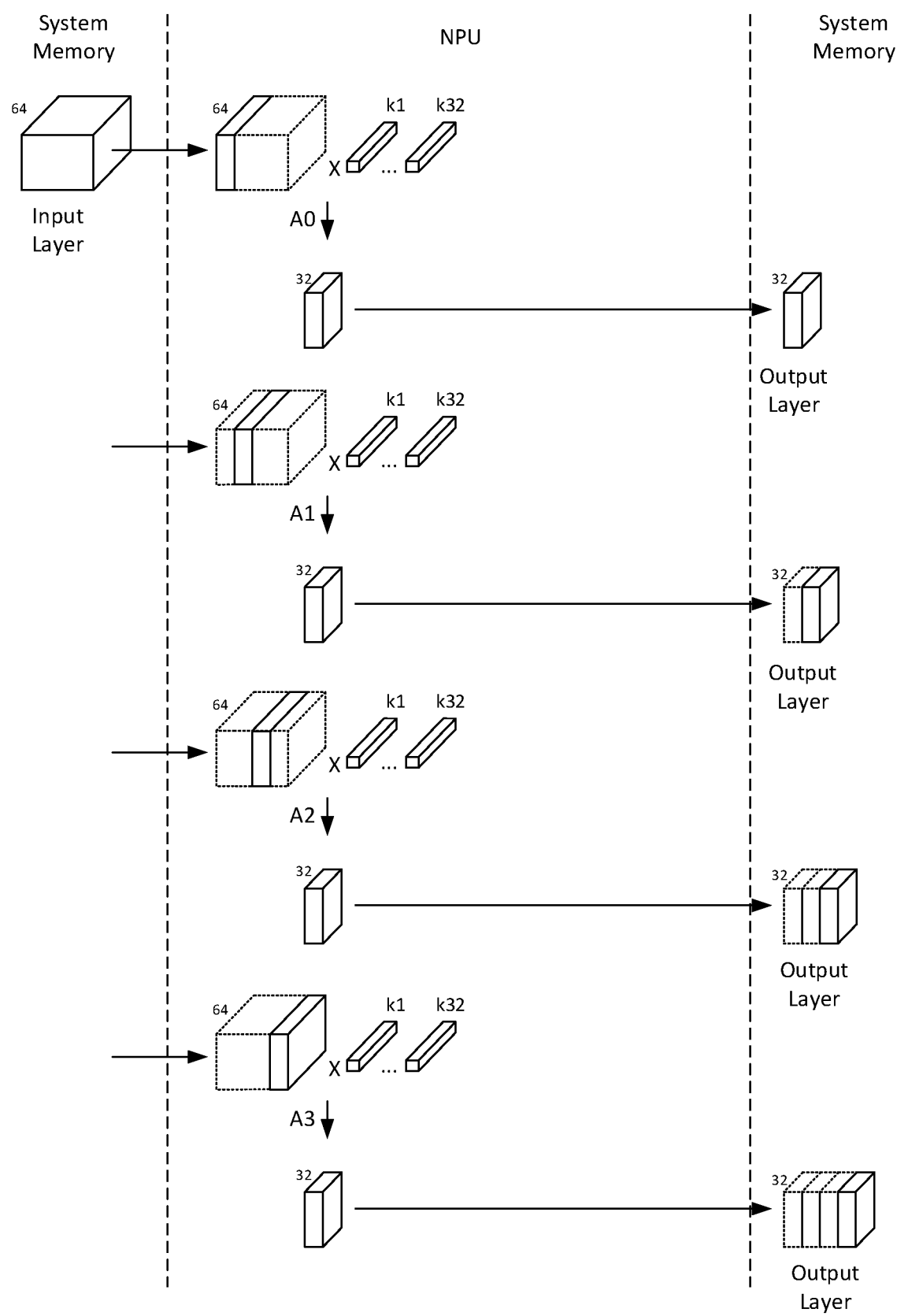
FIG. 3 illustrates an example of a convolution operation of a neural network.

FIG. 3 shows an example of a convolution operation in which the input layer is divided into four input blocks. The height and depth of each input block is the same as that of the input layer, and the width of each input block is one quarter of the width of the input layer. After operating on each input block, the resulting output block may be written to the system memory 40 as a block of the output layer.

Figure 4:
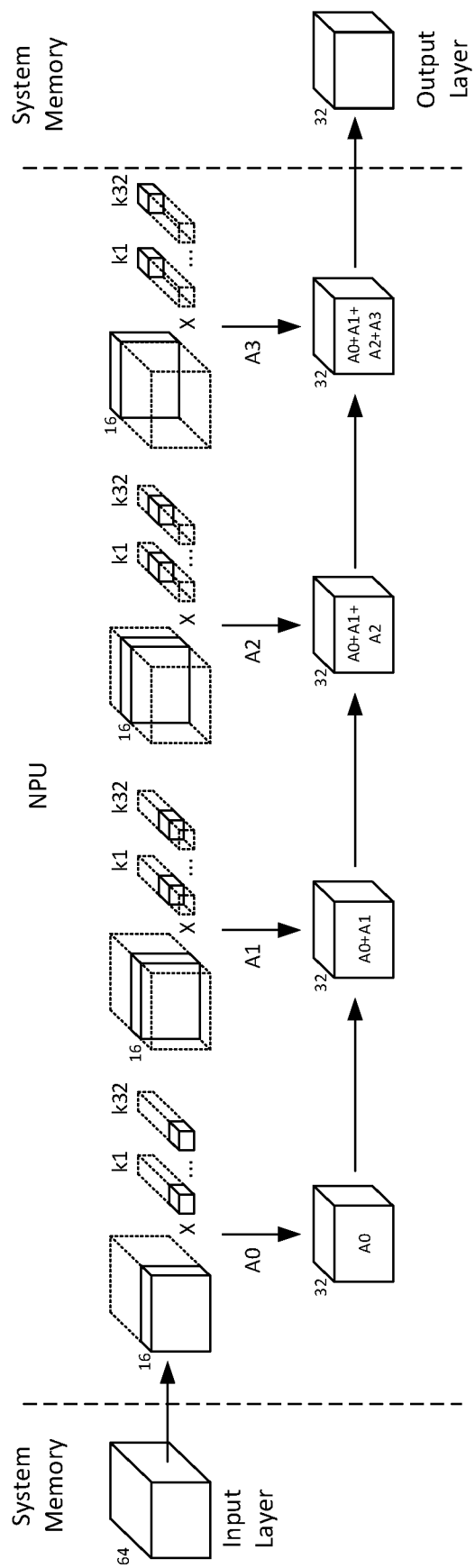
FIG. 4 illustrates a further example of a convolution operation of a neural network.

FIG. 4 shows a further example of a convolution operation in which the input layer is again divided into four input blocks. The input layer and the convolution layer are unchanged from the example of FIG. 3. However, in this example, the width and height of each input block is the same as that of the input layer, and the depth of each input block is one quarter of the depth of the input layer. Since the convolution operation sums over all channels in the depth direction, the NPU 30 does not write the output layer to the system memory 40 until the operation on all four input blocks has been completed. The NPU 30 therefore operates on the first input block and stores the resulting output block, A0, to the local memory 33. After operating on a second input block, the NPU 30 adds the resulting output block, A1, to the first output block, A0. The NPU 30 then repeats this process for the third and fourth input blocks. After completing the operation on all four blocks, the NPU 30 writes the accumulated block, A0+A1+A2+A3, to the system memory 40 as a block of the output layer, which in this instance happens to be the complete output layer.

The NPU 30 employs pipeline processing, which is to say that the NPU 30 employs an instruction pipeline having a number of stages. Since the output layer of a first operation serves as the input layer of a subsequent second operation, care must be taken to ensure that the second operation does not attempt to retrieve data from the system memory 40 before the first operation has written that data to the system memory 40.

Figure 5:
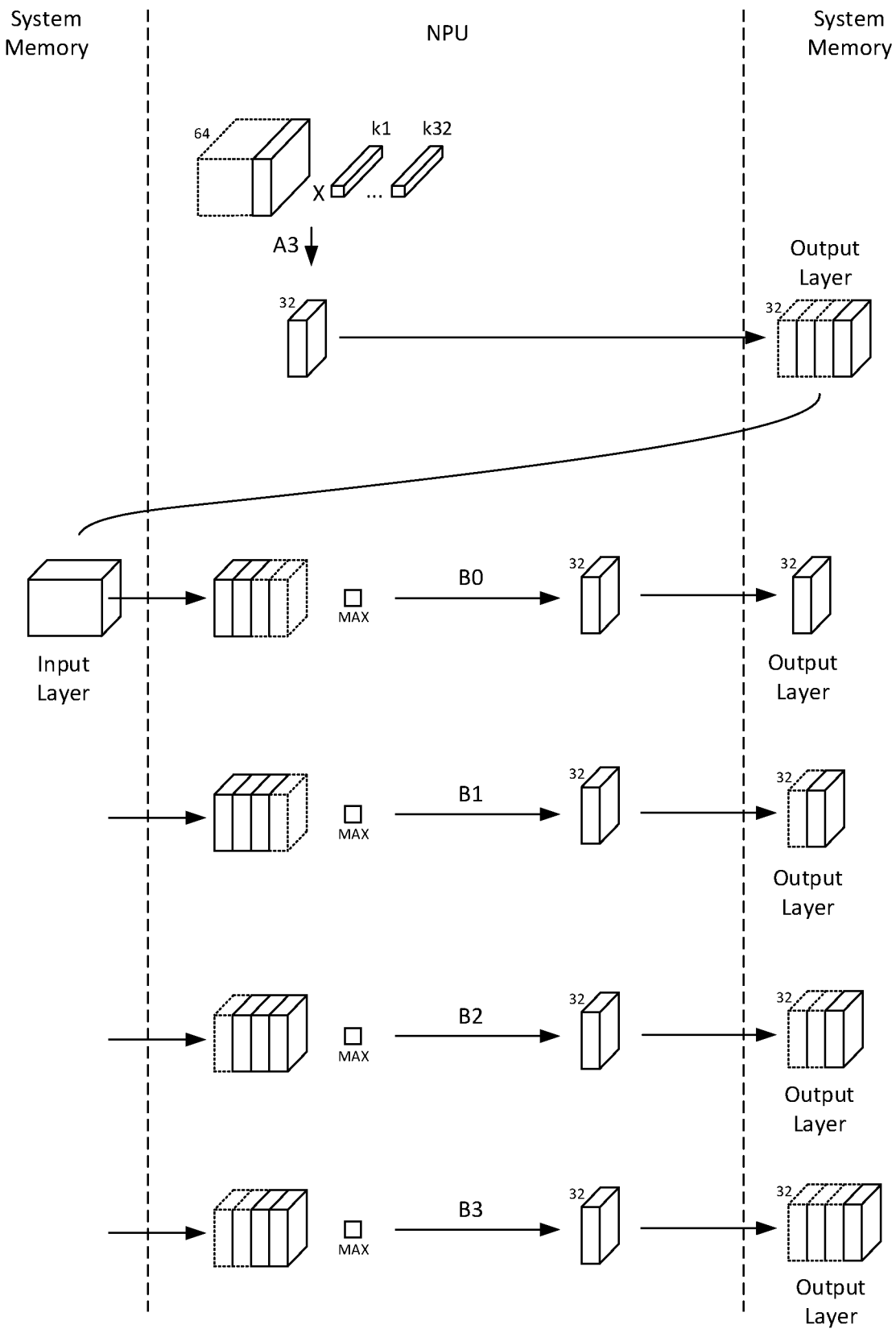
FIG. 5 illustrates an example of two consecutive operations of a neural network.

FIG. 5 illustrates an example of two consecutive operations. The first operation is the same convolution operation as that illustrated in FIG. 3, and the second operation is a pooling operation. In order to fit both operations on a single page, only the final stage of the first operation is shown in FIG. 5. As noted above in connection with FIG. 3, when performing the first operation, the NPU 30 divides the input layer into four input blocks. The NPU 30 then operates on each input block and generates an output block. The output block is then written to the system memory 40 as a block of the output layer. When performing the second operation, the NPU 30 again divides the input layer into four input blocks. Moreover, the input blocks of the second operation are the same size as the output blocks of the first operation. Accordingly, after the NPU 30 generates output block A0 and writes the block to the system memory 40, one might be forgiven for thinking that the NPU 30 is then free to perform the second operation. In particular, one might think that the NPU 30 is free to generate output block B0. However, as illustrated in FIG. 6, when the kernel 50 of the second operation reaches the righthand margin of the first input block 51, the receptive field of the kernel 50 extends beyond first input block 51 and into the second input block 52. Consequently, in order to generate output block B0, the second operation requires not only output block A0 of the first operation but also output block A1. Similarly, in order to generate output block B1, the second operation requires output blocks A0, A1 and A2 of the first operation. In order to generate output block B2, the second operation requires output block A1, A2 and A3 of the first operation. And in order to generate block B3, the second operation requires the output blocks A3 and A4 of the first operation. There is therefore a block dependency between the two operations, which is to say that the second operation cannot begin until such time as the first operation has generated a set number of output blocks.

Figure 7:
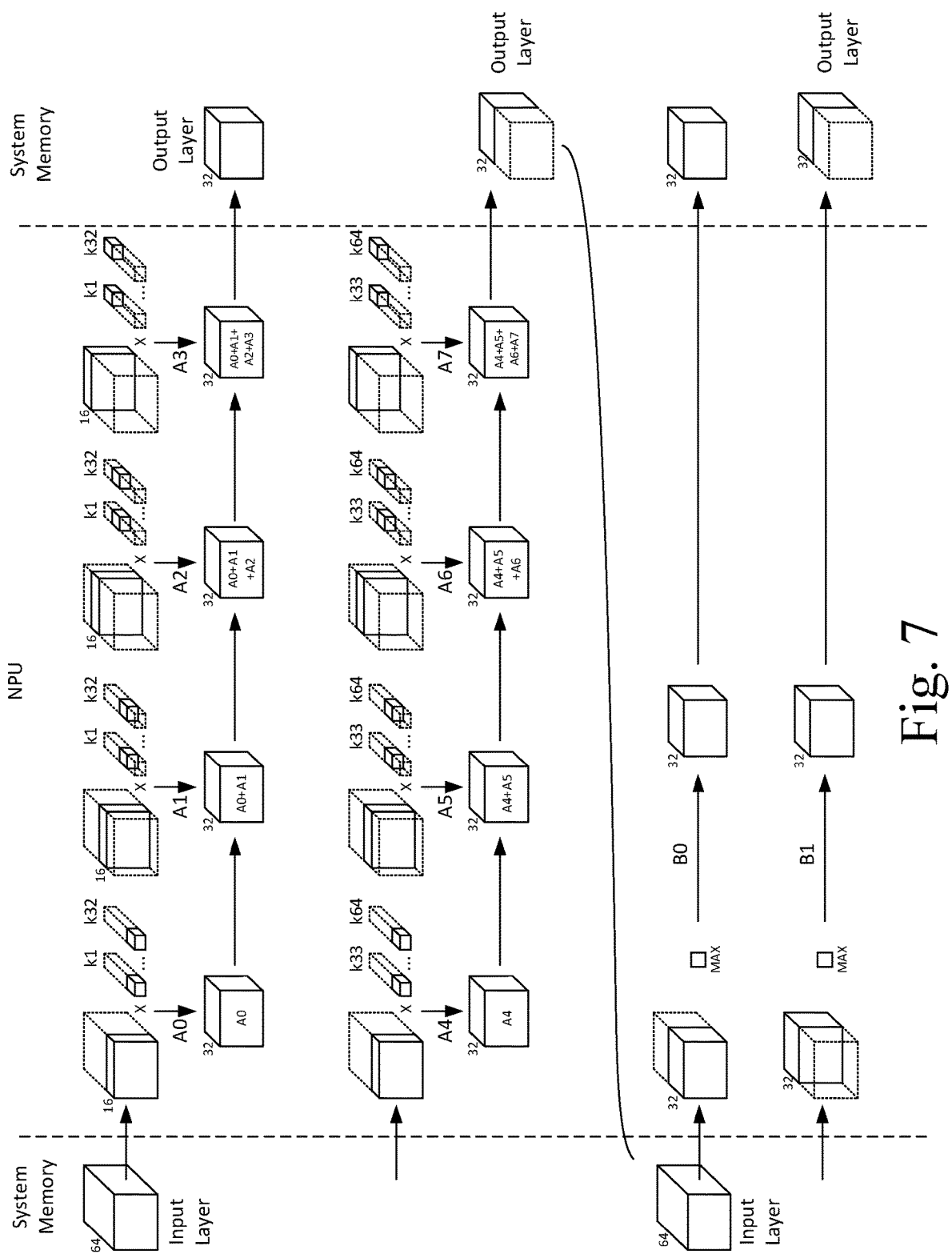
FIG. 7 illustrates a further example of two consecutive operations of a neural network.

FIG. 7 illustrates a further example of two consecutive operations. In this example, the first operation is again a convolution operation and the second operation is a pooling operation. When performing the first operation, the NPU 30 again divides the input layer into four input blocks. However, on this occasion, there is insufficient local memory to store the input block, the output block and the relevant block of the convolutional layer, which comprises 64 kernels. The NPU 30 therefore operates on the first input block using the first 32 kernels (k1-k32) of the convolutional layer to generate output block A0. The NPU 30 then repeats this process for the other three input blocks to generate output blocks A1, A2, A3. The NPU 30 adds the four output blocks together to generate an accumulated block, A0+A1+A2+A3, which the NPU then writes to the system memory as a first block of the output layer. The NPU 30 then operates on the first input block using the second 32 kernels (k32-k64) of the convolutional layer to generate output block A4. The NPU 30 then repeats this process for the other three input blocks to generate output blocks A5, A6, A7. The NPU 30 adds the four output blocks together to generate an accumulated block, A5+A6+A7+A8, which the NPU 30 then writes to the system memory as a second block of the output layer. It will therefore be appreciated that, in performing a particular operation of the neural network, the NPU 30 may operate on an input block more than once. When performing the second operation, the NPU 30 divides the input layer into two input blocks. The input blocks of the second operation are the same size as the output blocks of the first operation. Moreover, each input block of the second operation spans the entire width and height of the input layer. Accordingly, after the NPU 30 generates output block A3 and writes the accumulated block to the system memory, the NPU 30 is free to perform the second operation. The second operation is therefore free to generate output block B0 after the first operation generates output block A3. Likewise, the second operation is free to generate output block B1 after the first operation generates output block B7. There is again a block dependency between the two operations.

The command stream may therefore include an instruction that defines the block dependency between two consecutive operations. More particularly, the instruction may comprise block dependency data, which the NPU 30 then uses in order to determine when to perform the second operation.

The block dependency data may comprise a block dependency value which represents the number of output blocks that must be generated by the first operation before the NPU 30 is free to perform the second operation. So, for example, in response to a block dependency value of two, the NPU 30 is free to perform the second operation after the first operation has generated two output blocks. Alternatively, the block dependency value may represent the number of non-generated output blocks that are permissible before the NPU 30 is free to perform the second operation. So, for example, in response to a block dependency value of two, the NPU 30 is free to perform the second operation after the first operation has generated all but two of the output blocks.

The block dependency data may define a correlation between the output blocks of the two operations. In particular, the NPU 30 may be free to generate output block X of the second operation, only after the NPU 30 has generated output block Y of the first operation. Y is then a function of X and is defined by the block dependency data. By defining the block dependency in this way, a better balance may be achieved between generating output blocks of the second operation as soon as possible and ensuring that the required output blocks of the first operation have been generates and are available.

The block dependency data may comprise a single a block dependency value D, and the NPU 30 may perform the second operation necessary to generate output block X only after the NPU 30 has generated all but $\max(D-X,0)$ of the output blocks of the first operation. This dependency may be framed alternatively as follows. In response to a block dependency value of D, the NPU 30 may be free to perform the second operation necessary to generate output block X only after the first operation has generated output block $(N-1)-\max(D-X,0)$, where N is the total number of output blocks of the first operation and X is an integer in the range 0 to N−1. When using this particular block dependency function with the examples of FIGS. 5 and 7, block dependency values of respectively 2 and 1 may be used. This then ensures that it is not possible for the NPU 30 to generate an output block of the second operation until such time as all necessary output blocks of the first operation have been generated.

The block dependency data may comprise two or more values for use in defining Y as a function of X. For example, the block dependency data may comprise the values: D1 and D2, and the NPU 30 may perform the second operation necessary to generate output block X only after the NPU 30 has generated output block (D1.X+D2) of the first operation. When using this particular function with the example of FIG. 7, block dependency values of D1=4 and D2=3 may be used. As a result, the NPU 30 is free to generate output block B0 after output block A3 has been generated. By contrast, with the function described in the previous paragraph, the NPU 30 is free to generate output B0 only after output block A6 has been generated.

The block dependency data may comprise a block dependency value that is unique to one or more of the output blocks of the second operation. For example, the block dependency data may comprise the values D0 and D3. The NPU 30 then performs the second operation necessary to generate output block B0 (and also output blocks B1 and B2) only after the NPU 30 has generated output block D0 of the first operation (or alternatively after the NPU 30 has generated all but N−D0 blocks of the first operation). The NPU 30 then performs the second operation necessary to generate output block B3 (and all subsequent output blocks) only after the NPU 30 has generated output block D3 of the first operation (or alternatively after the NPU 30 has generated all but N−D3 blocks of the first operation). So in the example of FIG. 7, the block dependency data may include block dependency values of D0=3 and D1=7. The NPU 30 then generates output block B0 only after output block A3 has been generated, and generates output block B1 only after output block A7 has been generated.

Conceivably, the NPU 30 may employ more than one type of block dependency function. In this instance, the block dependency data may include an indicator of the block dependency function to be used by the NPU 30.

Various examples have thus far been described for expressing the block dependency between two operations. Common to each example is the premise that the NPU 30 performs the second operation only after the first operation has generated a set number of output blocks, which is defined by the block dependency data.

Figure 8:
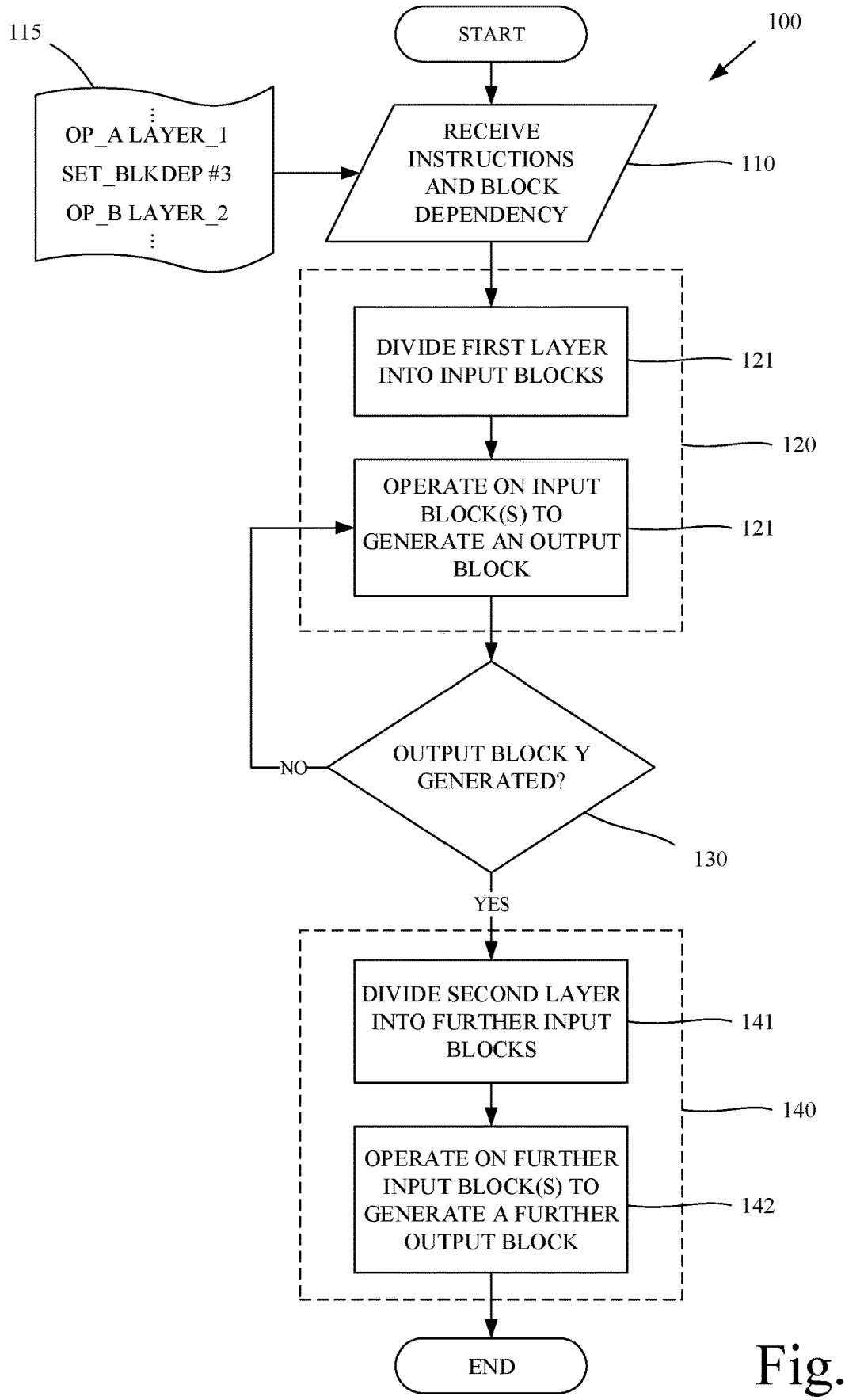
FIG. 8 is a flowchart of an example method for performing operations of a neural network.

FIG. 8 is an example of a method that may be performed by the NPU. The method 100 comprises receiving 110 a first instruction to perform an operation on a first input layer, block dependency data, and a second instruction to perform an operation on a second input layer. The instructions and block dependency data may be received in the form of a command stream 115. Upon receiving 110 the instructions and data dependency, the method 100 performs 120 the first operation. Performing 120 the first operation comprises dividing 121 the first layer into a plurality of input blocks and operating 122 on the input blocks to generate a plurality of output blocks. More specifically, the first operation operates 122 on one or more of the input blocks in order to generate each output block. The method 100 then determines 130 whether the output blocks generated by the first operation satisfy a criterion defined by the block dependency data. For example, the method may determine whether output block Y has been generated by the first operation, where Y is defined by the block dependency data. In the event that the criterion has been satisfied, the method performs 140 the second operation. As with the first operation, performing 140 the second operation may comprise dividing 141 the second layer into a plurality of input blocks and operating 142 on the input blocks to generate a plurality of output blocks. Again, as with the first operation, the second operation may operate 142 on one or more of the input blocks of the second layer in order to generate each output block. When performing 140 the second operation, the method 100 may operate on the input block(s) that generate output block X only after the first operation has generated output block Y. Y is then a function of X defined by the block dependency data.

By providing a processing unit that is capable of interpreting an instruction that includes block dependency data, the processing unit is able to perform operations of a neural network using pipeline processing without the risk of operating on invalid data. Additionally, the processing unit is able to perform the operations without the need to calculate, determine or otherwise make decisions about the data dependency, thus reducing the hardware requirements of the processing unit.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. A processor comprising a compute engine, control circuitry, and local memory, the control circuitry being configured to cause the processor to:

receive an instruction to perform a first operation of a neural network on a first input feature map stored in the local memory, the first input feature map serving as an input for the first operation of the neural network, and the first input feature map comprising a first multi-dimensional array of input values;

receive block dependency data comprising a block dependency value representing a set number of output blocks to be generated by the first operation before performing a second operation;

receive an instruction to perform the second operation of the neural network on a second input feature map stored in the local memory, the second input feature map serving as an input for the second operation of the neural network, and the second input feature map comprising a second multi-dimensional array of input values;

perform the first operation of the neural network using the compute engine, performing the first operation of the neural network comprising:

dividing the first input feature map into a plurality of input blocks each input block comprising a portion of the first multi-dimensional array;

performing a convolution operation on the plurality of input blocks using a plurality of weight values stored in the local memory to generate a plurality of output blocks; and generating the second input feature map using the plurality of output blocks; and perform at least a portion of the second operation of the neural network in parallel with at least a portion of the first operation using the compute engine, the second operation comprising dividing the second input feature map into a plurality of further input blocks and operating on the plurality of further input blocks to generate a plurality of further output blocks, wherein the second operation is performed after the first operation has generated the set number of output blocks and while the first operation is still generating output blocks from the input blocks.

2. The processor as claimed in claim 1, wherein the second operation operates on the further input blocks to generate further output block X after the first operation has generated output block Y, where Y is a function of X and is defined by the block dependency data.

3. The processor as claimed in claim 2, wherein the second operation operates on the further input blocks to generate further output block X after the first operation has generated all but max(D−X,0) of the output blocks, where D is defined by the block dependency data.

4. The processor as claimed claim 1, wherein the first operation generates N output blocks, and the processor performs the second operation after the first operation has generated N−Y output blocks, where Y is non-zero and is defined by the block dependency data.

5. The processor as claimed in claim 1, wherein the first operation comprises accumulating output blocks to generate an accumulated block, and the accumulated block forms part or all of the second input feature map.

6. A method for a processor, the method comprising:
receiving an instruction to perform a first operation of a neural network on a first input feature map stored in local memory of the processor, the first input feature map serving as an input for the first operation of the neural network, and the first input feature map comprising a first multi-dimensional array of input values;
receiving block dependency data comprising a block dependency value representing a set number of output blocks to be generated by the first operation before performing a second operation;
receiving an instruction to perform the second operation of the neural network on a second input feature map stored in local memory of the processor, the second input feature map serving as an input for the second operation of the neural network, and the second input feature map comprising a second multi-dimensional array of input values;
performing the first operation of the neural network using a compute engine of the processor, the first operation comprising:
dividing the first input feature map into a plurality of input blocks each input block comprising a portion of the first multi-dimensional array,
performing a convolution operation on the plurality of input blocks using a plurality of weight values stored in local memory to generate a plurality of output blocks; and
generating the second input feature map using the plurality of output blocks; and
performing at least a portion of the second operation of the neural network in parallel with at least a portion of the first operation using the compute engine of the processor, the second operation comprising:
dividing the second input feature map into a plurality of further input blocks; and
operating on the plurality of further input blocks to generate a plurality of further output blocks,
wherein the second operation is performed after the first operation has generated the set number of output blocks and while the first operation is still generating output blocks from the input blocks.

7. A system comprising:
a first processor and a first memory storing instructions which, when executed by the first processor, cause the first processor to output a command stream to a second processor, wherein the command stream comprises:
an instruction to perform a first operation of a neural network on a first input feature map stored in a local memory of the second processor, the first input feature map serving as an input for the first operation of the neural network, and the first input feature map comprising a first multi-dimensional array of input values;
block dependency data comprising a block dependency value representing a set number of output blocks to be generated by the first operation before performing a second operation; and
an instruction to perform the second operation of the neural network on a second input feature map stored in the local memory of the second processor, the second input feature map serving as an input for the second operation of the neural network, and the second input feature map comprising second multi-dimensional array of input values; and
the second processor comprising a compute engine, control circuitry, and the local memory, the control circuitry being configured to cause the second processor to, in response to the command stream:
perform the first operation of the neural network using the compute engine, the first operation comprising:
dividing the first input feature map into a plurality of input blocks;
performing a convolution operation on the plurality of input blocks using a plurality of weight values stored in local memory to generate a plurality of output blocks; and
generating the second input feature map using the plurality of output blocks; and
perform at least a portion of the second operation of the neural network in parallel with at least a portion of the first operation using the compute engine, the second operation comprising dividing the second input feature map into a plurality of further input blocks and operating on the plurality of further input blocks to generate a plurality of further output blocks, wherein the second operation is performed after the first operation has generated the set number of output blocks and while the first operation is still generating output blocks from the plurality of input blocks.

* * * * *